United States Patent [19]
Otto, Jr.

[11] 3,740,556
[45] June 19, 1973

[54] SPOT FILM DEVICE
[75] Inventor: George W. Otto, Jr., Elmhurst, Ill.
[73] Assignee: Litton Medical Products, Inc., Des Plaines, Ill.
[22] Filed: Nov. 26, 1971
[21] Appl. No.: 202,288

[52] U.S. Cl. .............................................. 250/66
[51] Int. Cl. ......................................... G03b 17/26
[58] Field of Search ...................................... 250/66

[56] References Cited
UNITED STATES PATENTS
2,890,346   6/1959   Kizaur et al. .......................... 250/66
3,524,059   8/1970   Bartlett................................. 250/66
2,807,726   9/1957   Scholz.................................. 250/66

Primary Examiner—William F. Lindquist
Attorney—Franklin D. Jankosky, Alfred B. Levine and Alan C. Rose

[57] ABSTRACT

An improved spot film device which includes a front loading and unloading area and a top loading and unloading area. A cassette carriage assembly, a cassette tray assembly and accompanying electromechanical means are utilized to allow a cassette to be loaded into either the front or the top of the spot film device and ejected from either the top or the front of the spot film device. A plurality of biased rollers is employed to allow cassettes of varying thicknesses to be retained within the cassette tray assembly.

16 Claims, 9 Drawing Figures

Patented June 19, 1973

GEORGE W. OTTO, JR.
INVENTOR

BY *[signature]*
ATTORNEY

Patented June 19, 1973

GEORGE W. OTTO, JR.
INVENTOR

BY Franklin D. Jankosky

ATTORNEY

Patented June 19, 1973 3,740,556

GEORGE W. OTTO, JR.
INVENTOR

BY Franklin D. Jacoby
ATTORNEY

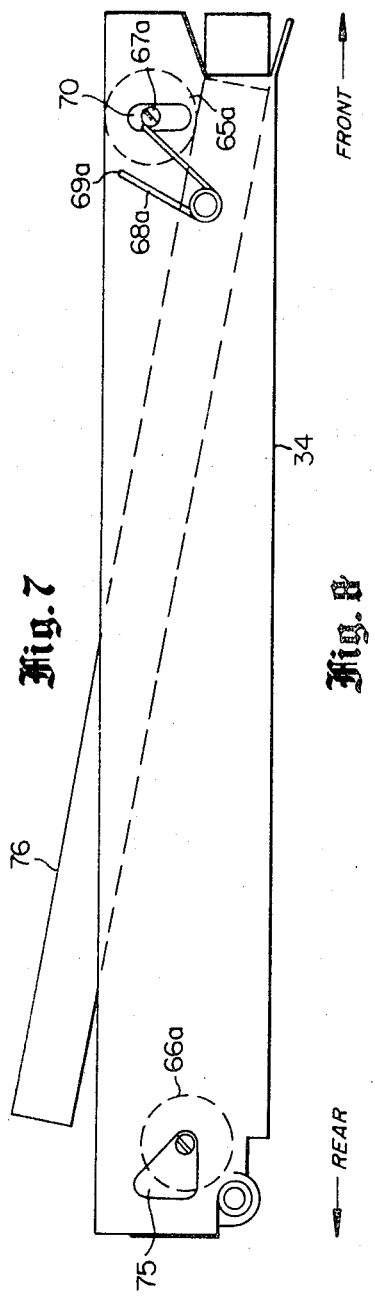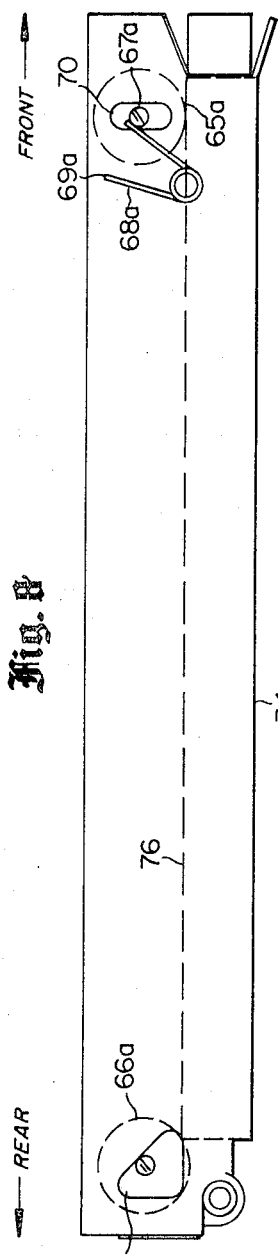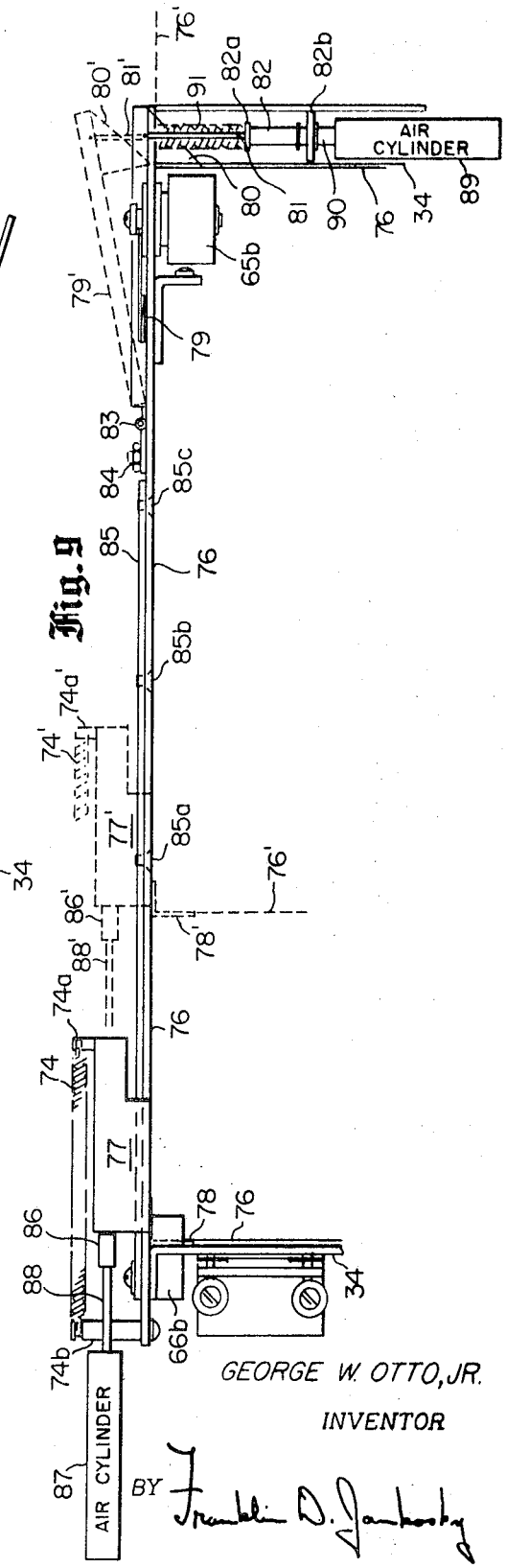

SPOT FILM DEVICE

FIELD OF THE INVENTION

This invention relates to spot film devices utilized in X-ray machines and more particularly to an improved spot film device which permits a cassette to be loaded in the front and unloaded from the front or the top, and further to be loaded in the top and unloaded from the front or the top.

DESCRIPTION OF THE PRIOR ART

Spot film devices per se are old in the art. There are many X-ray machines which permit a cassette to be loaded in and unloaded from the front, top or side of the spot film device. However, in such cases, the cassette can only be ejected through the opening into which it was inserted. To the best of my knowledge, no spot film device exists which permits the cassette to be loaded in the front and ejected from the front or the top, and loaded in the top and ejected from the front or the top.

Accordingly, it is an object of the present invention to provide an improved spot film device which permits top loading of a cassette and top and front unloading of that cassette.

It is a further object of the present invention to provide an improved spot film device which permits front loading of a cassette and top and front unloading of that cassette.

It is a still further object of the present invention to provide an improved spot film device which permits front loading of a cassette and front and top unloading of that cassette and further permits top loading of a cassette and front and top unloading of that cassette.

It is another object of the present invention to provide an improved spot film device wherein cassettes of various thicknesses may be loaded and unloaded at the top or front of the spot film device.

SUMMARY OF THE INVENTION

This invention provides an improved spot film device which includes a front loading and unloading area and a top loading and unloading area. A cassette carriage assembly, a cassette tray assembly and accompanying electromechanical means are utilized to allow a cassette to be loaded into either the front or the top of the spot film device and ejected from either the top or the front of the spot film device. A plurality of biased rollers is employed to allow cassettes of varying thicknesses to be retained within the cassette tray assembly.

BRIEF DESCRIPTION OF THE DRAWINGS

Additional objects, advantages and characteristic features of the present invention will become readily apparent from the following description of the preferred embodiments of the invention when taken in conjunction with the accompanying drawings, in which:

FIG. 7 is an enlarged side elevational view of the cassette tray assembly of FIG. 6 illustrating a cassette being loaded into such assembly in accordance with the present invention;

FIG. 8 is an enlarged side elevational view of the cassette tray assembly of FIG. 6 illustrating a cassette being retained within such assembly in accordance with the present invention; and FIG. 9 is an enlarged plan view of a portion of the cassette tray assembly of FIG. 5 illustrating the means for ejecting a cassette from the front of the spot film device in accordance with the present invention.

DESCRIPTION OF THE PREFERRED EMBODIMENTS

Figure 1:
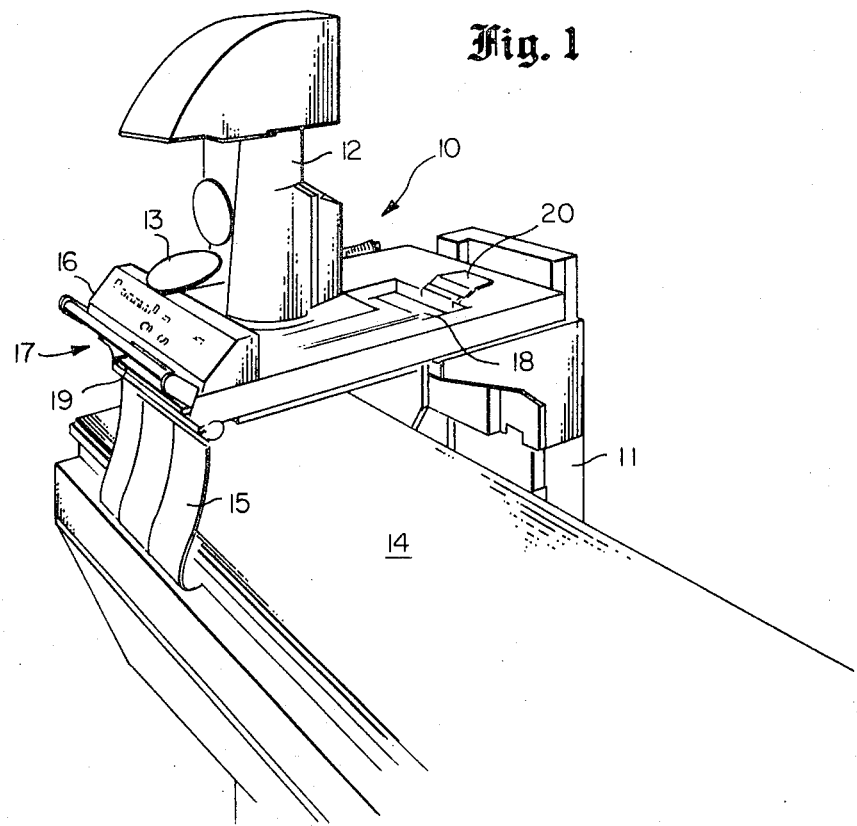
FIG. 1 is a perspective view of a spot film device located above an X-ray table in accordance with the present invention.

Referring now to FIG. 1, there is shown a spot film device 10 located above an X-ray table 14. The spot film device 10 is mounted on a tower 11 which allows the spot film device 10 to be moved in the vertical direction on the rails of the tower 11. A conventional image intensifier unit 12 is shown mounted on the spot film device 10 and the image intensifier unit 12 includes a mirror 13 which allows the radiologist to observe the area to be X-rayed. A lead shield 15 is utilized to protect the radiologist from exposure to X-rays.

The spot film device 10 generally includes a control panel 16, a front cassette loading and unloading area 17 and a top loading and unloading area 18. A cassette 19 is shown in its ejected position in the front loading and unloading area 17. Further illustrated is an ejection handle 20 for actuating means for ejecting a cassette from the top loading and unloading area 18. A cassette may be inserted into the spot film device 10 via the front area 17 and ejected via the front or top areas 17 and 18, and may also be inserted via the top area 18 and ejected via the front or top areas 17 and 18.

Figure 2:
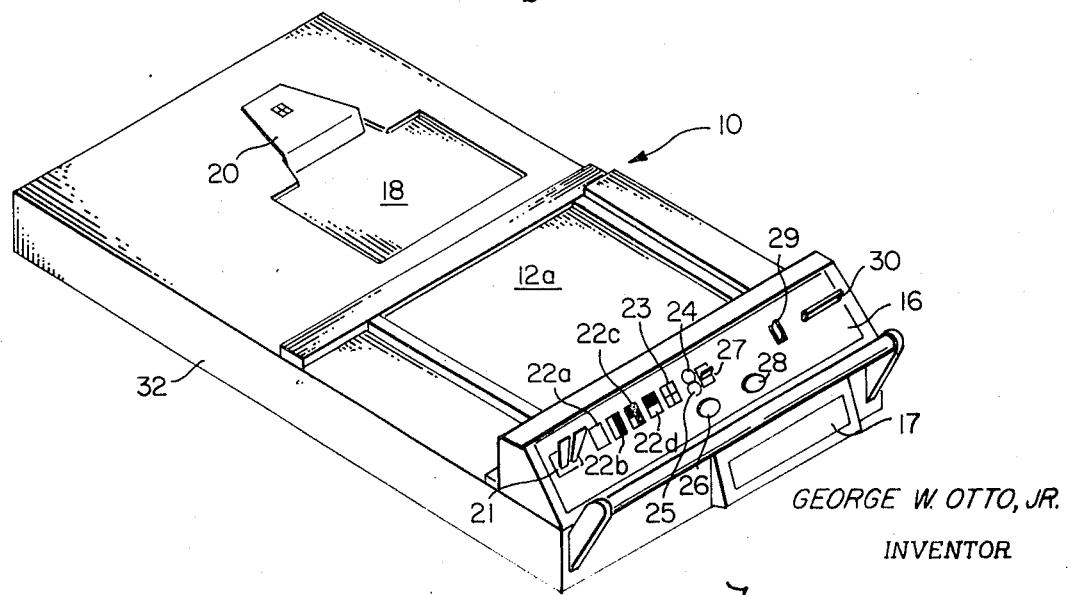
FIG. 2 is an enlarged perspective view of the spot film device of FIG. 1 in accordance with the present invention.

Referring now to FIG. 2, there is shown an enlarged perspective view of the spot film device 10. The image intensifier unit 12 would be mounted above the area identified by the designation 12a on the spot film device housing 32. The control panel 16 is comprised of the following controls and indicators: a pair of shutter control levers 21 for manually adjusting shutters located within the spot film device 10 to allow the radiologist to X-ray smaller areas than permitted by the automatic controls of the spot film device 10; cassette sequence selector pushbuttons 22a, 22b, 22c and 22d, which respectively actuate electromechanical means within the spot film device 10 to provide the radiologist with full, halves-transverse, quarters and halves-longitudinal exposures; a cassette sequence indicator and "skip" pushbutton 23, which actuates the sequencing mode and also provides an indication that sequence is being accomplished; a red indicator light 24, which indicates that the sequence is completed and the cassette is in position to be ejected from the top area 18 by means of the rear ejection handle 20; an amber light indicator 25, which indicates that the cassette tray assembly is in its front load or eject position; an exposure button 26, which actuates the exposure of the X-ray; a control 27 for transporting the cassette to either the front loading and unloading area 17 or the top loading and unloading area 18; a pushbutton 28 for ejecting the cassette from the front area 17; a control 29 for moving the X-ray table 14 lengthwise; and a control 30 for tilting the X-ray table 14. A handle 31 allows the radiologist to move the spot film device 10 to a desired position.

Figures 3, 4:
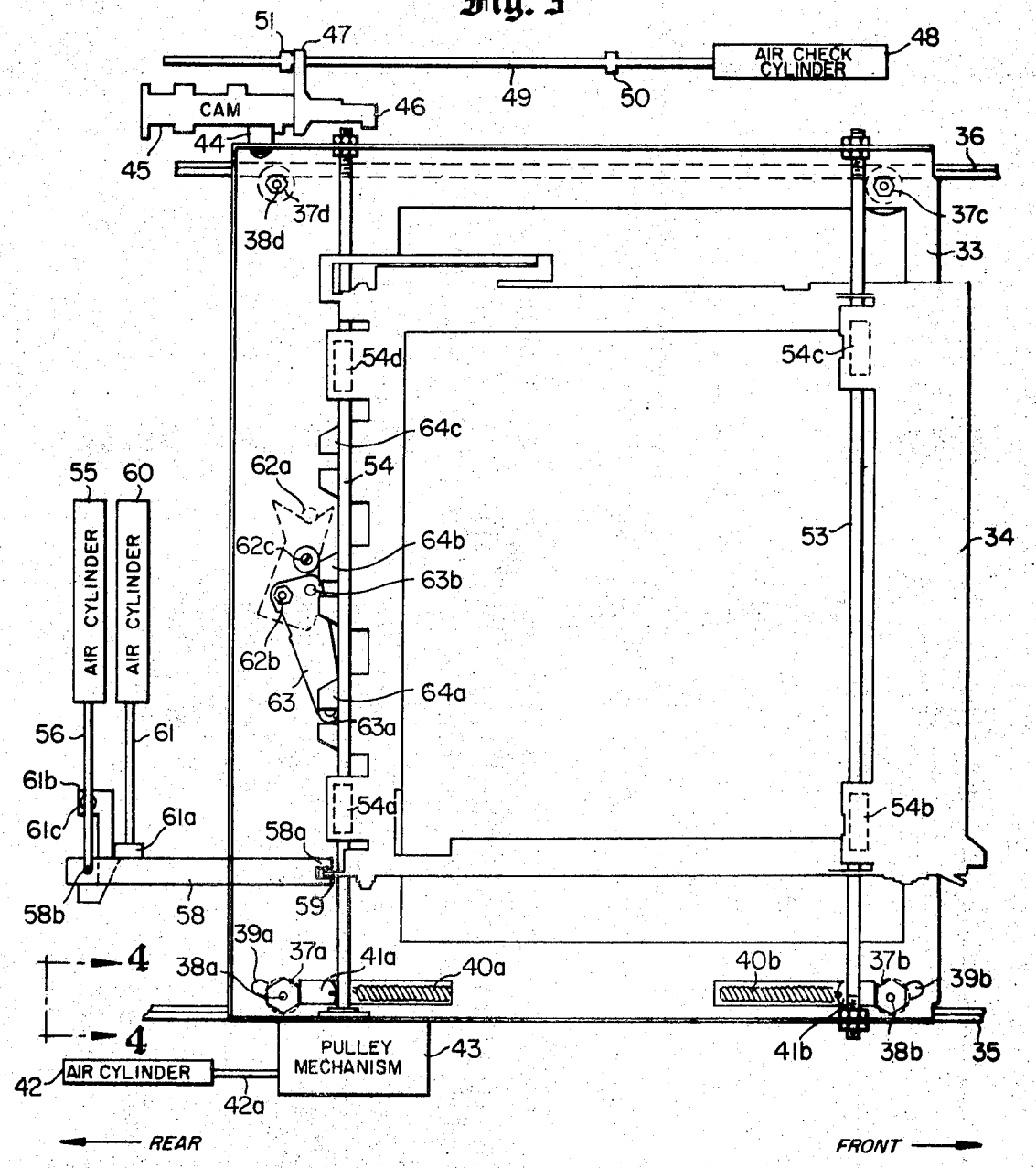
FIG. 3 is a plan view of a cassette carriage assembly and a cassette tray assembly and the means for moving such assemblies in accordance with the present invention.
FIG. 4 is an enlarged side elevational view taken along the line 4—4 of FIG. 3 and illustrates a cooperating Z-shaped rail and roller combination which facilitates movement of the cassette carriage assembly in accordance with the present invention.

Referring now to FIG. 3, there is shown a plan view of a cassette carriage assembly 33 and a cassette tray assembly 34 and the means for moving such assemblies in accordance with the principles of the present invention. The cassette carriage assembly 33 moves within the spot film device 10 in the longitudinal direction, i.e., from the front to the rear of the spot film device 10 and vice versa. The cassette tray assembly 34 moves in the transverse direction within the spot film device 10, i.e., from the left to the right and vice versa.

The cassette carriage assembly 33 includes four rollers 37a, b, c and d, shown as dashed circles, that are located under the cassette carriage assembly 33. The rollers 37a and 37b may be respectively retained within slots 39a and 39b of the cassette carriage assembly 33 by means of respective retaining means 38a and 38b. The rollers 37c and 37d may be respectively mounted on the cassette carriage assembly 33 by means of respective mounting means 38c and 38d. The pair of rollers 37a and 37b ride on a Z-shaped rail 35 and the pair of rollers 37c and 37d ride on a Z-shaped rail 36. A spring 40a and linkage member 41a are coupled to the retaining means 38a of roller 37a and a spring 40b and linkage 41b are coupled to the retaining means 38b of roller 37b in order that the pair of rollers 37a and 37b are properly biased to ensure that the cassette carriage assembly 33 remains on the pair of Z-shaped rails 35 and 36.

FIG. 4 is an enlarged side elevational view, taken along the line 4—4 of FIG. 3, of the roller 37a riding the Z-shaped rail 35. The pair of Z-shaped rails 35 and 36 may be respectively mounted within the spot film device housing 32, as schematically illustrated in FIG. 4.

The cassette carriage assembly 33 may be transported in the longitudinal direction within the spot film device 10 by means of an air cylinder 42, its accompanying piston rod 42a and a conventional pulley mechanism 43, which is schematically shown connected to the side of the cassette carriage assembly 33 at the bottom left of FIG. 3. The cassette carriage assembly 33 may be moved to five different longitudinal positions within the spot film device 10. The five positions include a rear park position, a front park position and three intermediate positions. The cassette carriage assembly 33 is shown in its rear park position. The means for locating the five above-mentioned positions is illustrated in the top left of FIG. 3. A positioning lug 44 is shown mounted to the cassette carriage assembly 33. Located immediately above the positioning lug 44 is a cam 45 and a cam attachment 46. The cam attachment 46 includes an upper member 47 which has an opening to allow the cam attachment member 46 to ride on a piston rod 49. The piston rod 49 includes a first pickup member 50 and a second pickup member 51. The right side of the piston rod 49 is mounted within an air check cylinder 48. The air check cylinder 48, its piston rod 49 and the pair of pickup members 50 and 51 ensure that the cassette carriage assembly 33 gently comes to rest in one of its predetermined positions.

For example, if the radiologist desires to transport the cassette carriage assembly 33 to the right in FIG. 3, or forward within the spot film device 10, he depresses the proper one of sequence selector pushbuttons 22a through 22d. The cam 45 then rotates to place the proper ear within the path of the positioning lug 44 that is mounted on the cassette carriage assembly 33. As the cassette carriage assembly 33 is being transported in the desired direction by means of the transportation mechanism described in the last paragraph, the positioning lug 44 picks up the positioned ear of the cam 45, and the cam 45 and its accompanying cam attachment 46 travel along with the cassette carriage assembly 33. The upper member 47 of the cam attachment 46 travels on the piston rod 49 and engages the pickup member 50 which drives the piston rod 49 into the air check cylinder 48 until the piston within the air check cylinder 48 comes to a cushioned stop to eliminate any abrupt stopping of the cassette carriage assembly 33. On the other hand, when the cassette carriage assembly 33 is being transported to the left of FIG. 3, or to the rear within the spot film device 10, the upper member 47 of the cam attachment 46 travels on the piston rod 49 to engage the pickup member 51 which pulls the piston rod 49 out of the air check cylinder 48 whereupon the piston within the air check cylinder 48 works against a vacuum within the air check cylinder 48 to provide cushioned stopping of the cassette carriage assembly 33.

The means for transporting the cassette tray assembly 34 in the transverse direction within the spot film device 10 will now be discussed. The cassette tray assembly 34 may be transported to three different transverse positions within the cassette carriage assembly 33. A pair of transverse rods 52 and 53 are mounted on the cassette carriage assembly 33, as shown. The cassette tray assembly 34, shown in partial schematic form, includes four ball bushings, 54a, b, c and d which allow the cassette tray assembly 34 to move on the pair of transverse rods 52 and 53. Located on the left side of the cassette tray assembly 34 are a positioning lug 59 and three positioning members 64a, b and c. Located to the immediate left of the cassette tray assembly 34 is the means that cooperates with the three positioning members 64a, b and c to lock and unlock the cassette tray assembly 34. The cassette tray assembly 34 must be unlocked from the cassette carriage assembly 33 before it can be transported in the transverse direction within the spot film device 10.

The means for locking and unlocking the cassette tray assembly 34 generally includes a fishtail member 62, a locking member 63, an actuator stub 62a and the three positioning members 64a, b and c. The fishtail member 62 is connected to the locking member 63 by means of a bushing 62b. The locking member 63 is located on the top side of the cassette carriage assembly 33 and is rotatably mounted to the cassette carriage assembly 33 by means of the pivot mounting means 63a. The fishtail member 62 is located on the under side of the cassette carriage assembly 33 and is rotatably mounted thereto by means of pivot mounting means 62c. The locking member 63 includes a locking pin 63b. The actuator stub 62a is mounted to the inner part of the housing 32 of the spot film device 10. In order to accomplish transverse positioning of the cassette tray assembly 34, the cassette carriage assembly 33 must be transported to its rear park position. As the cassette carriage assembly 33 is moved to its rear park position, the right end of the fishtail member 62 engages the actuator stub 62a, and the fishtail member 62 rotates in the clockwise direction as defined by the arrow 62d. In turn, the fishtail member 62 pulls the locking pin 63b out of the positioning member 64a, b or c in which it is located. The cassette tray assembly 34 is shown in its unlocked position. At the same time, the positioning lug 59 engages the slotted end 58a of the positioning member 58, as shown. The cassette tray assembly 34 is now in position to be moved in a transverse direction within the spot film device 10.

The means for moving the cassette tray assembly 34 in the transverse direction generally include the double-acting air cylinder 55, its accompanying piston rod 56, an air cylinder 60, its accompanying piston rod 61 and piston rod collar 61a, and intermediate positioning member 61b. The double-acting air cylinder 55 controls the positioning of the cassette tray assembly 34 in its two end positions and the air cylinder 60 controls the positioning of the cassette tray assembly 34 in its intermediate position. The cassette tray assembly 34 is shown in its intermediate transverse position. For example, when the radiologist desires to locate the cassette tray assembly 34 in one of its end positions, the air cylinder 55 is actuated and the piston rod 56, which is connected to the positioning member 58 by means of a set screw 58b, either pushes the positioning member 58 towards the bottom or pulls it towards the top of FIG. 3, i.e., to the left or right respectively within the spot film device 10. Since the positioning member 58 is in engagement with the positioning lug 59, the cassette tray assembly 34 will be transported to the desired position. When the radiologist desires to position the cassette tray assembly 34 to its intermediate position, the air cylinder 60 is actuated and the piston rod 61 travels to the left and the piston rod collar 61a picks up the intermediate positioning member 61b which pivots around its pivot mounting member 61c to lock the positioning member 58 and in turn lock the cassette tray assembly 34 in its desired intermediate transverse position.

When the cassette tray assembly 34 in is any one of its desired transverse positions, the cassette carriage assembly 33 may then be moved forward to the desired longitudinal position. The fishtail member 62 is biased by a spring, not shown, which ensures that the locking pin 63b enters one of the three positioning members 64a, b or c at initiation of forward movement of the cassette carriage assembly 33. It should be understood that while the above described means for moving the cassette carriage assembly 33 in the longitudinal direction and the cassette tray assembly 34 in the transverse direction have been described separately, both movements may be accomplished relatively simultaneously.

Figure 5:
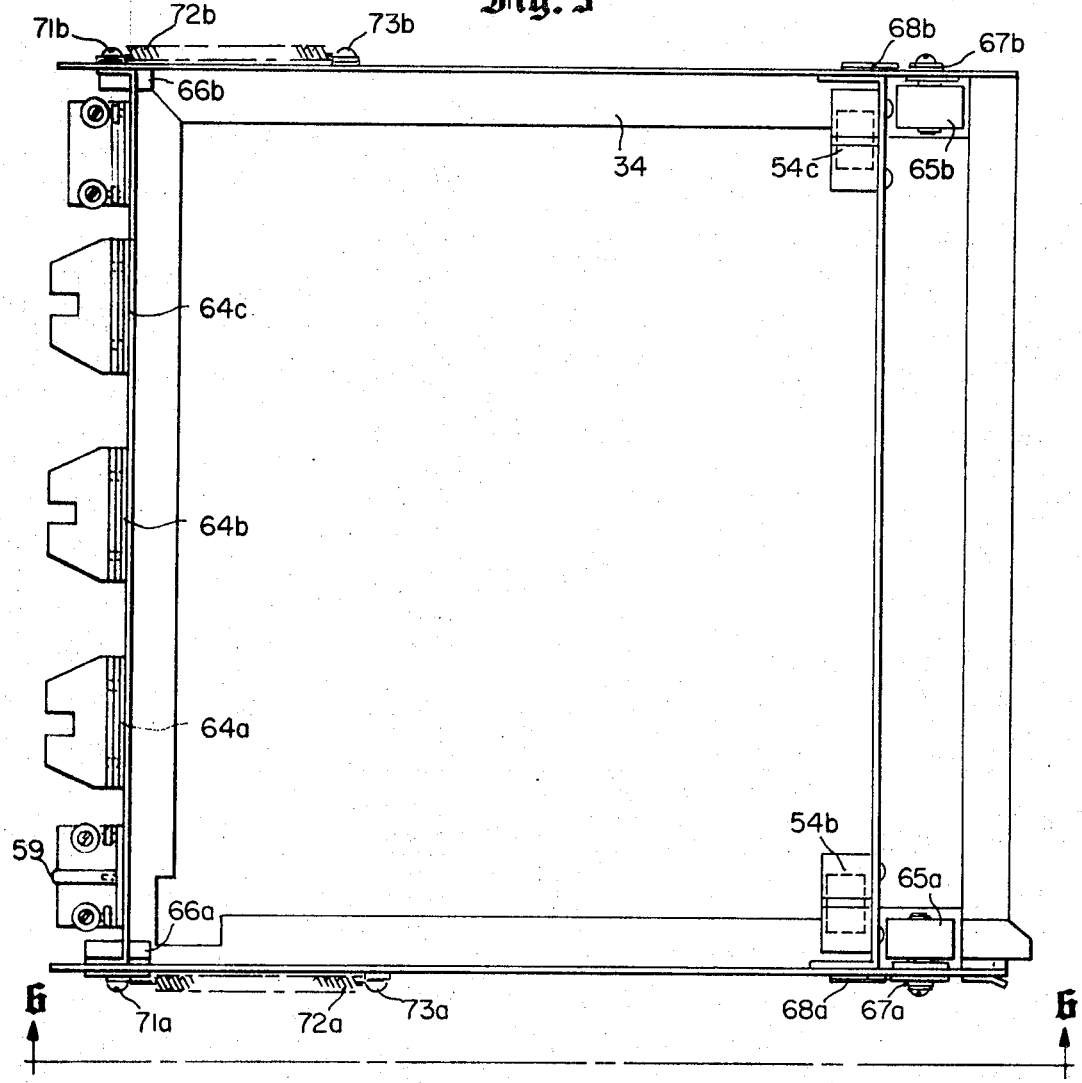
FIG. 5 is a plan view of a cassette tray assembly illustrating means for retaining a cassette within such assembly in accordance with the present invention.
Figure 6:
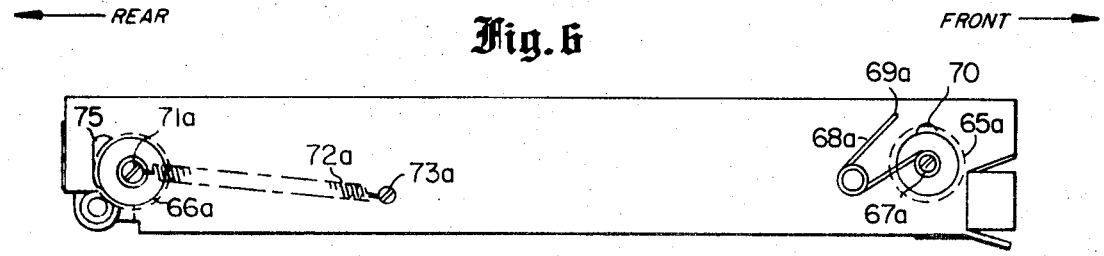
FIG. 6 is a side elevational view taken along the line 6—6 of FIG. 5 illustrating the means for retaining a cassette within the cassette tray assembly in accordance with the present invention.

Referring now to FIGS. 5 and 6, there are respectively shown a plan view and a side elevational view of a cassette tray assembly and means for retaining a cassette within such assembly in accordance with the principles of the present invention. The cassette tray assembly 34 includes two front rollers 65a and 65b and two rear rollers 66a and 66b. In FIG. 6, the front roller 65a is shown mounted within a vertical slot 70 by means of retaining means 67a. The front roller 65a is biased by a hair spring 68a which has one end connected to the retaining means 67a and the other end connected to the side of the cassette tray assembly 34 at 69a, as shown. The front roller 65a travels upwardly within the slot 70 when a cassette is loaded into the cassette tray assembly 34 from either the front loading area 17 or the top loading area 18. The front roller 65b is retained within a slot identical to the slot 70, and the front roller 65b operates in the same fashion as the front roller 65a by means of its accompanying retaining member 67b and the hair spring 68b.

Referring now to respective left sides of FIGS. 5 and 6, the rear roller 66a is retained within a triangular-shaped slot 75 by means of retaining means 71a. The rear roller 66a is biased by means of a tension spring 72a which has one end connected to the retaining means 71a and the other end is mounted to the cassette tray assembly 34 by means of the screw 73a. Upon the insertion of a cassette either from the front loading area 17 or the top loading area 18, the rear roller 66a moves rearwardly and up within the triangular-shaped slot 75 to allow the cassette to be properly aligned within the cassette tray assembly 34. The spring 72a then urges the roller 66a down and on top of the cassette in order to retain it within the cassette tray assembly 34. The rear roller 66b is retained within a triangular-shaped slot identical to the triangular-shaped slot 75, and the rear roller 66b is retained on the cassette tray assembly 34 and operates in the same fashion as the rear roller 66a by means of its accompanying retaining means 71b, tension spring 72b and screw 73b.

Referring now to FIGS. 7 and 8, there are shown enlarged side elevational views of the cassette tray assembly 34 of FIG. 6 respectively illustrating a cassette 76 being loaded into such assembly 34 and being retained within such assembly 34 in accordance with the principles of the present invention. Referring now specifically to FIG. 7, the cassette 76 is illustrated as being loaded in the cassette tray assembly 34 when such assembly is located in its rear park position, i.e., under the top loading area 18. The cassette 76 is placed under and against the pair of front rollers 65a and b so as to urge the pair of front rollers 65a and 65b upwardly in their respective slots. Referring now specifically to FIG. 8, the cassette 76 is illustrated as being retained within the cassette tray assembly 34. As the cassette 76 encounters the pair of rear rollers 66a and 66b, such rollers are urged to the rear and upwardly within their respective triangular-shaped slots. Once the cassette 76 reaches the bottom of the cassette tray assembly 34, as illustrated in FIG. 8, the pair of front rollers 65a and 65b and the pair of rear rollers 66a and 66b securely retain cassette 76 within the cassette tray assembly 34.

The pair of front rollers 65a and 65b, the pair of rear rollers 66a and 66b, and their accompanying biasing means determine which cassettes can be utilized within the spot film device 10. The present model of the spot film device 10 will accommodate both of the standard size 9½ inch by 9½ inch cassettes which have respective approximate thicknesses of ⅝ and ½ inches. The various components of the present model described in FIGS. 5, 6, 7 and 8 actually would accommodate cassettes varying in thickness between 7/16ths and ¾ inches. It should be understood that means of loading, unloading and retaining the cassette 76 in the cassette tray assembly 34 are not limited to accommodating cassettes of the aforementioned dimensions, and that spot film devices which employ 8 inch by 10 inch cassettes or 10 inch by 12 inch cassettes may utilize such means to accommodate such cassettes in varying thicknesses within the principles of the present invention.

Referring now to FIG. 9, there is shown a plan view of a portion of the cassette tray assembly 34 for the primary purpose of illustrating means for accomplishing loading and unloading of the cassette 76 from the front area 17 of the spot film device 10 in accordance with the principles of the present invention. Located on the left side of FIG. 9 is the means for ejecting cassette 76 from the spot film device 10. An ejector guide rail 85 is mounted to the side of the cassette tray assembly 34 by means of a plurality of screws, of which three screws 85a, b and c are shown. A movable bracket 77 is mounted on the ejector guide rail 85. The movable bracket 77 is retained in its normal position at the rear end of the cassette tray assembly 34 by means of a spring 74, which has one end connected to the cassette tray assembly 34 by means of the mounting means 74b and the other end is connected to the bracket 77 by means of the mounting member 74a. The movable bracket 77 includes a member 78 which is located under the rear roller 66b. When the cassette 76 is sitting within the cassette tray assembly 34, it is located immediately in front of the member 78. Further shown is an air cylinder 87, its accompanying piston rod 88 and a pawl 86 which is connected to the right end of the piston rod 88.

Located on the left side of FIG. 9 are additional means for controlling the loading and unloading of the cassette 76 to and from the front area 17 of the spot film device 10. A rotatable member 79 is mounted to the cassette tray assembly 34 by means of a hinge 83 and its accompanying hinge mounting means 84. The rotatable member 79 includes a wedge-shaped stop member 80 which inhibits the cassette 76 from sliding forward within the cassette tray assembly 34. Further illustrated is an air cylinder 89 having a piston rod 90, a rod 82 having a shoulder 82a, a smaller diameter rod 81 which is secured to the rod 82, the rod 82 is mounted to the cassette tray assembly 34 by suitable mounting member 82b, and a compression spring 91 which encircles the smaller diameter rod 81 and is retained in position by the shoulder 82a and a side wall of the cassette tray assembly 34.

In order to eject the cassette 76 from the spot film device 10, the radiologist depresses the ejection pushbutton 28 which actuates the air cylinders 87 and 89. The piston rod 90 of the air cylinder 89 drives the rod 82, and the smaller diameter rod 81 travels to its new position 81' to force the rotatable member 79 to its new position 79', as shown. Since the wedge-shaped stop member 80 is now in its new position 80', the cassette 76 is ready to be moved to the right, i.e., forward to the front area 17 of the spot film device 10. Simultaneously, the pawl 86 is driven to the right by the piston rod 88 of the air cylinder 87 to push the movable bracket 77 to its new position 77'. The member 78 of the movable bracket 77 moves to the right and carries the cassette 76 approximately 4 inches to its new position 76', as illustrated. The spring 74 then returns the movable bracket 77 to its normal position. The cassette 76' is now sitting in the front area 17 as illustrated in FIG. 1, and it may be lifted out of the spot film device 10 by the radiologist.

In loading the cassette 76 into the spot film device 10 via the front area 17, the cassette 76 encounters the wedge-shaped stop member 80. Since the stop member 80 is wedge-shaped and is mounted to rotate out of the front area 17, the loading of a cassette at the front of the spot film device 10 forces the wedge-shaped stop member 80 to its new position 80'. The cassette 76 may be passed under the pair of front rollers 65a and 65b until it reaches the rear of the cassette tray assembly 34 and under the rear rollers 66a and 66b, at which time the compression spring 91 returns the wedge-shaped stop member 80 to its normal position.

In prior art spot film devices, it was the practice to use a leaf-spring mechanism at the rear end of the cassette tray assembly to retain the cassettes in place. The leaf-spring mechanism extended over the cassette and such mechanism could not be moved to the rear to allow the cassette to be loaded or unloaded from the top. The use of the pair of front rollers 65a and 65b and the pair of rear rollers 66a and 66b overcome the limitations of the prior art. The ejection handle 20 may be depressed to actuate conventional mechanical means, not shown, that are located under the cassette 76 to force the rear end of the cassette 76 against the pair of rear rollers 66a and 66b so that they move within their triangular-shaped slots to allow the cassette 76 to be placed in the top unloading area 18. The front and top loading and unloading capabilities of the spot film device 10 thus enables the radiologist and his technical assistant to stand on opposite sides of the X-ray table 14 and to coordinate their movements to efficiently accomplish a series of X-ray exposures.

Thus, although the present invention has been shown and described with reference to particular embodiments, such as, a cassette tray assembly accommodating cassettes of the above described thicknesses, nevertheless, various changes and modifications obvious to a person skilled in the art to which the invention pertains, for example, rollers of different size to accommodate cassettes of various thicknesses, are deemed to lie within the spirit, scope and contemplation of the invention as set forth in he appended claims.

What is claimed is:

1. A spot film device for X-ray apparatus providing front and top loading and unloading of a cassette comprising:
    a housing having a compartment for containing the cassette;
    a front aperture communicating with said housing compartment for receiving the cassette;
    a top aperture communicating with said housing compartment for receiving the cassette; and
    means movably mounted on said housing for retaining the cassette within said housing compartment, said retaining means being displaceable within said housing to enable the cassette to be selectively loaded from the front or top aperture and selectively unloaded from the front or top aperture regardless of the aperture through which the cassette was loaded.

2. A spot film device as recited in claim 1 wherein said retaining means includes a plurality of rollers which are resiliently mounted within said housing and being associated with said housing to retain said cassette in said housing compartment.

3. A spot film device as recited in claim 1 wherein said retaining means includes:
   a pair of respective front rollers located above said received cassette, said pair of respective front rollers are mounted within a pair of respective vertical slots and are biased to rest upon said received cassette; and
   a pair of respective rear rollers located partially above said received cassette, said pair of respective rear rollers are mounted within a pair of respective triangular-shaped slots and are biased to rest upon said received cassette.

4. A spot film device as recited in claim 3 wherein said pair of respective front rollers are biased by a respective pair of tension springs and said pair of respective rear rollers are biased by a pair of respective hair springs.

5. A spot film device as recited in claim 3 wherein said pair of respective front rollers are adapted to travel upwardly in said pair of respective vertical slots when said cassette is loaded through either said front aperture or said top aperture and said cassette initiates contact with said pair of respective front rollers.

6. A spot film device as recited in claim 3 wherein said pair of respective rear rollers travel rearwardly and upwardly in said pair of respective triangular-shaped slots when said cassette is loaded through either said front aperture or said top aperture and said cassette initiates contact with said pair of respective rear rollers.

7. A spot film device for X-ray apparatus having a front aperture and a top aperture for loading and unloading a cassette comprising:
   cassette carriage assembly means for transporting said cassette in a longitudinal direction within said spot film device;
   cassette tray assembly means mounted on said cassette carriage assembly means, said cassette tray assembly means for receiving and retaining said cassette, said cassette tray assembly means for transporting said cassette in a transverse direction within said spot film device, and said cassette tray assembly means cooperating with said cassette carriage assembly means for transporting said cassette in the longitudinal and transverse directions within said spot film device and between said front and said top apertures;
   first ejection means mounted on said spot film device and located in proximity of said top loading and unloading aperture, said first ejection means for ejecting said cassette into said top loading and unloading aperture;
   second ejection means mounted on said cassette tray assembly means for ejecting said cassette into said front loading and unloading aperture;
   a pair of respective movable biased front rollers located above said received cassette and a pair of respective vertical slots, said pair of respected front rollers mounted within said pair of respective vertical slots and biased to rest upon said received cassette when said cassette is located within said tray assembly; and
   a pair of respective movable biased rear rollers located partially above said received cassette and a pair of respective triangular-shaped slots, said pair of respective rear rollers mounted within said pair of respective triangular-shaped slots and biased to rest upon said received cassette when said cassette is located within said tray assembly.

8. A spot film device as recited in claim 7 wherein said pair of respective front rollers are biased by a respective pair of tension springs and said pair of respective rear rollers are biased by a respective pair of hair springs.

9. A spot film device as recited in claim 7 wherein:
   said pair of respective front rollers travel upwardly in said pair of respective vertical slots when said cassette is loaded through either said front aperture or said top aperture and said cassette properly contacts said pair of respective front rollers; and
   said pair of respective rear rollers travel rearwardly and upwardly in said pair of respective triangular-shaped slots when said cassette is loaded through either said front aperture or said top aperture and said cassette properly contacts said pair of respective rear rollers.

10. A spot film device as recited in claim 7 wherein:
    said pair of respective front rollers travel upwardly in said pair of respective vertical slots when said cassette is unloaded through said top aperture; and
    said pair of respective rear rollers travel rearwardly and upwardly in said pair of respective triangular-shaped slots when said cassette is unloaded through said top aperture.

11. A spot film device as recited in claim 7 wherein said cassette travels underneath said pair of respective front rollers when said cassette is unloaded through said front aperture.

12. A cassette tray assembly for receiving and retaining a cassette within a spot film device comprising:
    a frame for supporting said cassette;
    a plurality of biased rollers movably mounted on said frame and adapted to retain said cassette within said frame;
    said frame includes a lower portion for supporting said cassette and a pair of opposing side walls having respective first and second ends, said pair of opposing side walls each having a vertically disposed slot at said respective opposing first ends and further having a triangular-shaped slot at said respective opposing second ends; and
    said plurality of biased rollers includes a first pair of biased rollers respectively movably mounted in said pair of respective vertical slots and a second pair of biased rollers respectively movably mounted in said pair of respective triangular-shaped slots.

13. A cassette tray assembly as recited in claim 12 wherein:
    said first pair of biased rollers travel upwardly within said pair of respective vertical slots when said cassette is loaded into said cassette tray assembly; and
    said second pair of biased rollers travel vertically and horizontally away from said cassette within said pair of respective triangular-shaped slots when said cassette is loaded into said cassette tray assembly.

14. A cassette tray assembly as recited in claim 13 wherein:
    said frame includes an aperture located between said respective opposing first ends and said pair of opposing side walls; and said first pair of biased rollers travel upwardly in said pair of respective vertical slots when said cassette is passed through said aperture.

15. A cassette tray assembly as recited in claim 13 wherein:
said frame includes an aperture located above said pair of opposing side walls; and
said cassette may be loaded from above and through said aperture.

16. A cassette tray assembly as recited in claim 12 wherein:
said first pair of biased rollers is biased towards said lower portion of said frame, and said received cassette is retained between said first pair of biased rollers and said lower portion of said frame; and
said second pair of biased rollers is biased towards said lower portion of said frame, and said received cassette is retained between said second pair of biased rollers and said lower portion of said frame.

* * * * *